(12) United States Patent
La Bergerie et al.

(10) Patent No.: US 6,881,432 B2
(45) Date of Patent: *Apr. 19, 2005

(54) DEXTROSE HYDRATE IN POWDER FORM AND A PROCESS FOR THE PREPARATION THEREOF

(75) Inventors: Erik La Bergerie, Lestrem (FR); Philippe Lefevre, Merville (FR); José Lis, La Gorgue (FR)

(73) Assignee: Roquette Freres, Lestrem (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/735,092

(22) Filed: Dec. 12, 2000

(65) Prior Publication Data

US 2001/0018092 A1 Aug. 30, 2001

(30) Foreign Application Priority Data

Dec. 17, 1999 (FR) ............................................. 99 15951

(51) Int. Cl.⁷ ........................... A23G 3/00; C13K 13/00
(52) U.S. Cl. ....................... 426/658; 426/285; 426/443; 127/30
(58) Field of Search ................................. 426/285, 443, 426/453, 454, 658, 661, 458; 127/30

(56) References Cited

U.S. PATENT DOCUMENTS

| | | | |
|---|---|---|---|
| 4,357,172 A | * | 11/1982 | Edwards ...................... 127/60 |
| 4,831,129 A | | 5/1989 | Serpelloni |
| 6,451,122 B1 | * | 9/2002 | Moraly et al. ................. 127/30 |

FOREIGN PATENT DOCUMENTS

| | | |
|---|---|---|
| EP | 0 192 460 | 8/1986 |
| GB | 1 112 553 | 5/1965 |
| WO | WO 94/28181 | 12/1994 |

OTHER PUBLICATIONS

Derwent World Patents Index abstract of FR 2 787 811 of Jun. 30, 2000 (France).
Derwent World Patents Index abstract of FR 2 398 802 of Feb. 23, 1979 (France).
Abstract of FR 1 331 252 of May 20, 1963.
Handbook of Pharmaceutical Excipients, pp. 149–150, no date.
Armstrong, Drug Development and Industrial Pharmacy, 1986, 12(11–13), 1885–1901.

* cited by examiner

*Primary Examiner*—Leslie Wong
(74) *Attorney, Agent, or Firm*—Young & Thompson

(57) ABSTRACT

The invention relates to a dextrose hydrate in powder form, having a dextrose content at least equal to 98%, an α crystalline form content at least equal to 95%, a water content greater than 1%, a compressibility determined according to a test A, at least equal to 70 N. The invention also relates to a process for the preparation thereof and to the use of said dextrose hydrate in powder form as a sweetener, osmotic agent, nutrient or excipient, particularly in compositions intended for the food, pharmaceutical, chemical and agrochemical sectors.

19 Claims, No Drawings

DEXTROSE HYDRATE IN POWDER FORM AND A PROCESS FOR THE PREPARATION THEREOF

BACKGROUND OF THE INVENTION

The present invention relates to a dextrose in powder form with a high dextrose content and a substantially α crystalline form, having a particular water content and of which the industrial use properties, particularly in direct compression, are improved.

The present invention also relates to a dextrose hydrate in powder form having a remarkable density and particle size and also having good flowability, and to a process for the preparation thereof.

Within the meaning of the invention, the term "dextrose hydrate in powder form" means a dextrose in powder form having a water content greater than 1%, preferably in the range 2% to 10% and even more preferably from 5% to 9.5%.

Dextrose, produced industrially by hydrolysis of various starches, has been commonly used, mainly in the food industry, for numerous years.

It is used to advantage in applications where it is necessary to have products in powder form, for example, for the production of tablets, chocolates, Viennese bread and buns, cakes and pastries, nutrient compositions for plants or various mixtures in powder form where it usually acts as a sweetener, osmotic agent, nutrient and/or excipient.

Three crystalline forms of dextrose are conventionally described, i.e. α dextrose monohydrate, anhydrous α dextrose and anhydrous β dextrose.

Although numerous processes have been proposed for directly converting glucose solutions into solid materials of any crystalline form, α dextrose monohydrate remains the virtually exclusive source of dextrose powder.

This α dextrose monohydrate is conventionally produced by slow crystallisation, by cooling supersaturated syrups with a high glucose content originating from the hydrolysis of starch.

However, any dextrose in powder form composed of this sole crystalline species and prepared in the conventional manner is generally not very compressible, and it is necessary to add maltodextrins or polysaccharides to it for the production of tablets. In spite of this, the products prepared in this way have generally been unsatisfactory because of problems of agglomeration and handling due to the maltodextrins or polysaccharides.

Anhydrous α crystalline dextrose, a very pure crystalline dextrose with a low water content, i.e. at most equal to 1%, was therefore chosen.

This anhydrous α dextrose is generally produced by crystallisation of glucose at temperatures in the range 50° C. to 65° C., for example, by evapocrystallisation in autoclaves under high vacuum and under carefully controlled operating conditions.

However, the anhydrous α dextrose thus obtained has the disadvantages of dissolving relatively slowly in water and having a tendency to cake during dissolution. In fact, a part of the anhydrous α dextrose is converted once again during this dissolution to α dextrose monohydrate which agglomerates and delays the dissolution of the anhydrous α dextrose accordingly.

In order to dissolve satisfactorily the two α monohydrate and anhydrous α forms, it is necessary, therefore, to use water at high temperature or to add the dextrose gradually to water with stirring.

It was then proposed, therefore, to use an anhydrous β crystalline dextrose which has a much better rate of dissolution compared with that of anhydrous α dextrose and even monohydrate.

However, it is well known to experts in the crystallisation of dextrose that although the transition point of the crystallisation of α dextrose monohydrate to anhydrous α dextrose is about 55° C., that of anhydrous α dextrose to anhydrous β dextrose is about 110° C.

It follows that, in order to obtain anhydrous β dextrose, it is necessary to operate at a very high temperature at which dextrose is not very stable. This result limits all the more the industrial use of such a crystallisation process.

Patent application FR 2.398.802 describes a dextrose in powder form which has good flowability, does not agglomerate, is appreciably free from an unpleasant taste and coloured impurities but also has satisfactory compression properties. The authors of this patent point out, however, that this dextrose in powder form is, in fact, composed of a mixture, in roughly equivalent amounts, of anhydrous α and β dextrose. The process for the preparation thereof by crystallisation and granulation is, moreover, particularly long and tedious.

It is apparent from the above that there is an unsatisfied need to obtain a dextrose hydrate in powder form with a high glucose content and high crystalline purity and which also has excellent compressibility and very good flowability.

BRIEF SUMMARY OF THE INVENTION

To its merit, the Applicant company has therefore developed, after considerable research, a new dextrose hydrate in powder form.

DETAILED DESCRIPTION OF THE INVENTION

The dextrose hydrate in powder form according to the invention is thus characterised initially in that it has:

- a dextrose content at least equal to 98%,
- an α crystalline form content at least equal to 95%,
- a water content greater than 1%, preferably in the range 2% to 10% and even more preferably from 5% to 9.5%,
- a compressibility, determined according to a test A, at least equal to 70 N, preferably at least equal to 90 N, and even more preferably in the range 90 N to 200 N.

The dextrose content may be measured by a conventional high performance liquid chromatography method. It is determined here at a value at least equal to 98%.

The crystallinity is a measure of the crystalline structure or otherwise of the product. This crystallinity is determined by measuring the latent heat of fusion by means of a differential calorimeter. The crystallinity of the product is determined by comparing its latent heat of fusion with that of crystalline references containing variable proportions of α and β dextrose.

The proportion of the α crystalline form contained in the dextrose in powder form according to the invention represents at least 95 wt. % of the total crystalline forms of said dextrose in powder form.

The moisture content of the particles is also measured by conventional methods known, moreover, to the skilled person, for example, by the KARL-FISCHER method. The water content of said dextrose hydrate in powder form is thus greater than 1% and more particularly in the range 2% to 10%. As will be shown by examples below, the dextrose hydrates in powder form having a water content in the range 5% to 9.5% and more particularly in the range 7% to 8% have the best properties in compression.

The compressibility of the dextrose hydrate in powder form according to the invention is determined by the use of the two tests A and B below.

Test A, described in patent EP 220.103 owned by the Applicant company consists in measuring the force, expressed in newtons, which is representative of the compressibility of the dextrose hydrate in powder form studied. This force therefore reflects here the resistance to crushing of a tablet which is cylindrical with convex sides (radius of curvature 13 mm), having a diameter of 13 mm, a thickness of 6 mm and a weight of 0.734 g, i.e. an apparent density of 1.3 g/ml.

Test B, which makes it possible to define the dextrose hydrates in powder form having better compression properties, consists in measuring, on an ERWEKA TBH 30 durometer, the resistance to crushing of a cylindrical tablet with convex sides (radius of curvature 13 mm), having a diameter of 13 mm, a thickness of 6 mm and a weight of 0.762 g, i.e. an apparent density of 1.35 g/ml.

The dextrose hydrates in powder form according to the invention thus have a compressibility value according to test A at least equal to 70 N and in particular in the range 90 N to 200 N. Moreover, some of them, which are more compressible, which have a compressibility value according to test A in the range 150 N to 200 N, also have a compressibility value according to test B at least equal to 170 N, and advantageously in the range 175 N to 300 N.

It is surprising that a dextrose hydrate in powder form can simultaneously have such a high dextrose content, i.e. at least equal to 98%, of which the α crystalline monohydrate form represents at least 95%, and a high compressibility without it being necessary to introduce particular additives, this compressibility being expressed by values, according to said test A, at least equal to 70 N, preferably at least equal to 90 N, and even more preferably in the range 90 N to 200 N.

It is also particularly remarkable that such a dextrose hydrate in powder form may also have, according to said test A, a compressibility in the range 150 N to 200 N and also, according to test B, a compressibility at least equal to 170 N, preferably in the range 175 N to 300 N.

To the Applicant company's knowledge, no dextrose hydrate in powder form exists in the prior art which has such compression properties and such a dextrose crystalline purity.

In fact, it is accepted very conventionally that the preparation of a dextrose in powder form having high compression properties requires α dextrose monohydrate to be mixed with additives such as maltose and maltodextrins, or the preparation of mixed compositions of anhydrous α and β forms of dextrose, for example, by atomisation of a glucose syrup with a high dry substance content.

Consequently and unexpectedly, the dextrose hydrates in powder form according to the invention have a remarkably high compressibility for a crystalline purity which has never been achieved by dextrose monohydrates in powder form of the prior art.

By way of example, the dextrose monohydrates in powder form sold under the brand names EMDEX®, UNIDEX®, ROYAL T® and CANTAB® in the field of direct compression and which are generally obtained by atomisation of a glucose syrup having a dextrose equivalent (DE) of 93% to 99%, as specified in appendix 3 of the monograph "Dextrates" of the Handbook of Pharmaceutical Excipients have, according to test A, compression values at most equal to 150 N and according to test B, compression values below 170 N.

A close analysis of their composition reveals, however, that they contain, in total, from 5 wt. % to 6 wt. % of maltose, maltotriose and oligosaccharides with a higher DP.

The dextrose hydrate in powder form according to the invention may also be characterised by its apparent density and by its mean diameter.

The determination of the apparent density is carried out using an instrument sold by HOSOKAWA under the brand name POWDER TESTER by applying the method recommended for measuring an apparent density.

Under these conditions, the dextrose hydrate in powder form according to the invention has a relatively low apparent density, generally lower than 0.7 g/ml, preferably in the range 0.45 g/ml to 0.65 g/ml, and even more preferably in the range 0.5 g/ml to 0.6 g/ml.

The dextrose hydrate in powder form according to the invention generally has a mean diameter in the range 50 $\mu$m to 1000 $\mu$m, preferably from 100 $\mu$m to 500 $\mu$m. These values are determined on a LASER LS particle size analyser with the brand name COULTER® by determining the volumetric distribution by size of the particles of dextrose hydrate in powder form.

Moreover, it is also possible to characterise the dextrose hydrate in powder form according to the invention by its flowability, this property being particularly suitable for applications in compression, and for those of the preparation of nutrient mixtures in powder form.

The flowability of said dextrose is evaluated using the POWDER TESTER instrument sold by HOSOKAWA. This instrument makes it possible to measure, under standardised and reproducible conditions, the flowability of a powder and to calculate a flow grade, also known as the Carr index. The dextrose hydrate in powder form according to the invention has an excellent flow grade, generally at least 60, preferably in the range 60 to 90. This value is generally greater than that of the powders of crystalline dextrose monohydrate of the prior art and is equivalent to the dextrose powders of the dextrate type.

The high compressibility of said dextrose hydrate in powder form and its flowability therefore allow the production, by simple direct compression, of tablets of great hardness (tablets of the type to be sucked) or of medium hardness (tablets of the typed to be chewed).

Without wishing to be bound by any theory, it may be thought that the physical/chemical characteristics mentioned above of the glucose hydrate in powder form according to the invention explain its excellent flowability. These characteristics relate in particular to its dextrose content, its crystalline purity, and its centred particle size distribution.

The dextrose hydrate in powder form according to the invention may be obtained by carrying out a succession of steps consisting in a step involving the rehumidification/granulation, using a suitable binder, of a crystalline dextrose in the substantially α form obtained directly by crystallisation or by partial or complete drying of a crystalline dextrose monohydrate, then a step involving the ageing/drying of the rehumidified granulated dextrose thus obtained.

The binder may be composed solely of water in a quantity such that it makes it possible to control the hydrate nature of the final product obtained, or a glucose syrup with a variable dry substance content, preferably in the range 40% to 80%. The proportion of dry substance introduced by the binder is selected such as to keep the level of the β crystalline form of the final product at a value at most equal to 5% and the purity in glucose at least equal to 98%.

In a first preferred embodiment of the process according to the invention, a dextrose in the substantially α crystalline form is used, the water content of which is at most equal to 1%. Granulation by the wet method will be carried out with from 2% to 20% of water introduced by the binder.

In a second preferred embodiment of the process according to the invention, a dextrose in the substantially α crystalline form is used, the water content of which is in the range 1% to 8%. Granulation by the wet method will be carried out in this case with from 1% to 12% of water introduced by the binder.

In a third preferred embodiment of the process according to the invention, a dextrose in the substantially α crystalline form is used, the water content of which is in the range 8% to 10%. Granulation by the wet method will be carried out in this case with from 1% to 8% of water introduced by the binder.

The ageing/drying step will be carried out in these three preferred embodiments in such a way as to obtain a dextrose in powder form according to the invention having a final water content at least equal to 1%, preferably in the range 2% to 10%, and even more preferably in the range 5% to 9.5%.

The term "substantially α crystalline form" means a dextrose powder whose α crystalline form represents at least 95 wt. % of the crystalline forms which dextrose may take.

It should be pointed out that, as the Applicant company has observed, the product according to the invention cannot be prepared from a glucose solution by simple atomisation, crystallisation or granulation because in this case the remarkable compressibility properties can, in fact, be obtained only by the addition of additives, as pointed out above.

Thus, the tests in climate-controlled containers for obtaining compressible dextrose monohydrates having variable water contents, carried out in another connection by ARMSTRONG et al. (in Drug Development and Industrial Pharmacy, 1986, 12, pp 1885–1901) did not enable their designer to obtain dextroses having such compression properties.

In the process according to the invention, the preferred starting product selected is an α crystalline dextrose having a water content greater than 1%, preferably in the range 2% to 10%, in order to obtain a dextrose hydrate according to the invention having, according to test A, a compressibility at least equal to 70 N and advantageously in the range 90 N to 200 N.

More preferably, the dextrose selected is an α crystalline dextrose having a water content at most equal to 1% in order to obtain a dextrose hydrate in powder form according to the invention having, according to test A, a compressibility in the range 150 N to 200 N, and according to test B, a compressibility at least equal to 170 N and in particular in the range 175 N to 300 N.

Surprisingly and unexpectedly, the Applicant company observed that the granulation of a dextrose powder by the wet method using a binder makes it possible to prepare, with a high yield, a product according to the invention in terms of its compressibility, and also in terms of its flowability, density and particle size.

In fact, the processes described previously do not make it possible to obtain all the desired characteristics.

Granulation may be carried out using, for example, a mixer-granulator operating batchwise, semi-continuously or continuously such as the vertical FLEXOMIX sold by SCHUGI, a device of the DRIAM or DUMOULIN type, or the horizontal CB sold by LÖDIGE into which is introduced, by way of a weight feeder, the starting dextrose powder to be granulated continuously and the binder by way of a volumetric feeder.

Preferably, a continuous mixer-granulator of the SCHUGI vertical FLEXOMIX type is used. The starting dextrose powder and the binder are very intimately mixed in the mixer-granulator fitted with a shaft with knives arranged in the form of blades, and a system of spraying liquids by way of injection nozzles.

According to a preferred embodiment of the invention, satisfactory dispersion of the constituents and agglomeration of the particles of the starting dextrose powder are carried out by high speed stirring, i.e. at a value at least equal to 1000 rpm, preferably at least equal to 3500 rpm. At the outlet of the mixer-granulator, the granules formed are discharged continuously into a dryer-ageing device.

Discharge takes place preferably by gravity in the case of said vertical granulator, and by thrust by way of the shaft of rotating knives if the horizontal granulator is used.

This second drying-ageing step at the outlet of the mixer-granulator makes it possible to remove, if necessary, all or part of the water originating from the binder such that crystallisation and stabilisation take place after the prior granulation step, whilst keeping the water content of the final product at a value greater than 1%, particularly in the range 2% to 10%.

The dryer-ageing device may be, for example, a fluidised bed dryer-ageing device or a rotary ageing drum. The dextrose hydrate in powder form according to the invention is obtained after cooling and optionally sieving.

In this case, the fine particles may be recycled directly to the start of granulation, and the coarse particles may be ground and recycled to the start of sieving.

The dextrose hydrate in powder form according to the invention may be used advantageously, by virtue of its functional properties mentioned above, as a sweetener, osmotic agent, nutrient or excipient in compositions used in all types of industry, particularly in the food, pharmaceutical, chemical and agrochemical sectors.

Moreover, certain advantageous properties of said dextrose hydrate in powder form favour its use in the preparation of tablets to be sucked, chewed, dissolved or swallowed, particularly intended for the above-mentioned sectors.

Other features and advantages of the invention will become apparent on reading the examples which follow. They are given here, however, only by way of non-limiting example.

EXAMPLE 1

A vertical FLEXOMIX mixer-granulator from SCHUGI is fed continuously by way of a powder feeder at a flow rate of 500 kg/h to 600 kg/h with a crystalline dextrose monohydrate produced by crystallisation with a water content of 8.4%.

Moreover, the mixer-granulator is fed continuously with the binder at 25° C. and at a flow rate from 25 l/h to 35 l/h by way of a spray nozzle. The rotating knife shaft is adjusted beforehand to a speed of 3500 rpm.

The moist granulated powder at the outlet of the mixer-granulator falls continuously by gravity into a SCHUGI fluidised bed drier-ageing device with four compartments. In the first three compartments the granulated product is dried by air at 70° C. then cooled with air at 25° C. in the last compartment. The granulated, dried and cooled product is then sieved continuously over a rotary screen fitted with a wire mesh of 740 μm.

The starting crystalline dextrose monohydrate A and the dextrose hydrates in powder form B, C, and D according to the invention prepared respectively with water, a glucose solution with a 30% dry substance content and a glucose solution with a 60% dry substance content as binder, have the characteristics summarised in table I below.

TABLE I

| Parameters | A | B | C | D |
|---|---|---|---|---|
| Dextrose content (wt. %) | >99 | >99 | >99 | >99 |
| α crystalline form content (%) | >98 | >98 | >98 | >98 |
| Water content (%) | 8.4 | 8.5 | 6.7 | 6.3 |
| Apparent density (g/ml) | 0.52 | 0.57 | 0.49 | 0.49 |
| Mean diameter (μm) | 92 | 176 | 171 | 198 |
| Flow grade (value/100) | 41 | 73 | 72 | 73 |
| Compressibility (N) - test A | 50 | 77 | 103 | 103 |
| Compressibility (N) - test B | 60 | 110 | 143 | 147 |

EXAMPLE 2

A vertical FLEXOMIX mixer-granulator from SCHUGI is fed continuously via a powder meter at a flow rate of 500 kg/h with a crystalline dextrose, the water content of which is 5%.

Moreover, the mixer-granulator is fed continuously with water at 25° C. and at a flow rate of 35 l/h via a spray nozzle.

The rotating knife shaft is adjusted beforehand to a speed of 3500 rpm.

The moist granulated powder at the outlet of the mixer-granulator falls continuously by gravity into a SCHUGI fluidised bed drier-ageing device with four compartments in which the granulated product is stabilised by air at 30° C.

The granulated product thus obtained is then sieved continuously over a rotary screen fitted with a wire mesh of 740 μm.

The starting crystalline dextrose containing 5% water E and the dextrose hydrate in powder form F according to the invention have the characteristics summarised in table II below.

TABLE II

| Parameters | E | F |
|---|---|---|
| Dextrose content (wt. %) | >99 | >99 |
| α crystalline form content (%) | >98 | >98 |
| Water content (%) | 5 | 7.6 |
| Apparent density (g/ml) | 0.60 | 0.56 |
| Mean diameter (μm) | 241 | 300 |
| Flow grade (value/100) | 53 | 73 |
| Compressibility (N) - test A | <50 | 83 |
| Compressibility (N) - test B | <50 | 111 |

EXAMPLE 3

A vertical FLEXOMIX mixer-granulator from SCHUGI is fed continuously via a powder meter at a flow rate of 800 kg/h with a crystalline dextrose, the water content of which is 0.5%.

Moreover, the mixer-granulator is fed continuously with water at 25° C. and at a flow rate of 80 l/h via a spray nozzle. The rotating knife shaft is adjusted beforehand to a speed of 3500 rpm.

The moist granulated powder at the outlet of the mixer-granulator falls continuously by gravity into a SCHUGI fluidised bed drier-ageing device with four compartments in which the granulated product is stabilised by air at 30° C.

The product thus stabilised is then sieved continuously over a rotary screen fitted with a wire mesh of 740 μm.

The starting crystalline dextrose G and the dextrose hydrate in powder form H according to the invention have the characteristics summarised in table III below.

TABLE III

| Parameters | G | H |
|---|---|---|
| Dextrose content (wt. %) | >99 | >99 |
| α crystalline form content (%) | >98 | >98 |
| Water content (%) | 0.5 | 7.6 |
| Apparent density (g/ml) | 0.53 | 0.59 |
| Mean diameter (μm) | 224 | 434 |
| Flow grade (value/100) | 43 | 81 |
| Compressibility (N) - test A | 45 | 195 |
| Compressibility (N) - test B | 50 | 260 |

EXAMPLE 4

Other products in powder form according to the invention are prepared by applying the process described in examples 1, 2 and 3, but modifying the conditions of use so as to obtain a range of samples having variable degrees of hydration and compressibility.

The products obtained have the characteristics set out in table IV below, and are compared with dextroses in powder form known elsewhere.

TABLE IV

| Parameters | Products according to the invention | CERELOSE | CANTAB ® |
|---|---|---|---|
| Dextrose content (wt. %) | >99 | 99.1 | 94.7 |
| Maltose content (%) | <1 | 0.7 | 3.7 |
| Maltotriose content (%) | <0.5 | 0.1 | 0.6 |
| α Crystalline form content (%) | >95 | >99.8 | n.d. |
| Water content (%) | 2.3–8.7 | 9.1 | 9.2 |
| Apparent density (g/ml) | 0.49–0.59 | 0.58 | 0.61 |
| Mean diameter (μm) | 99–474 | 350 | 260 |
| Flow grade (value/100) | 60–90 | 75 | 70 |
| Compressibility (N) Test A | 70–200 | 60 | 131 |
| Compressibility (N) Test B | 175–300 | 143 | 163 | n.d. not determined

The dextrose hydrates in powder form according to the invention, compared with the products of the prior art, all have excellent functional properties in terms of their flowability and, in particular, compressibility, and this despite high dextrose contents and high crystalline purity in the α form.

These new products, particularly those having a compressibility greater than 200 N, are particularly suitable for use without disadvantage in the food, pharmaceutical, chemical and agrochemical industries, particularly as compression agents. To the Applicant company's knowledge, no dextrose in powder form exists which has a compressibility value, according to test A, in the range 180 N to 200 N and according to test B greater than 220 N, and advantageously greater than 230 N.

EXAMPLE 5

The production of tablets to be sucked intended for the preparation of confectionery is carried out on the basis of dextrose hydrates in powder form according to the invention or otherwise.

The composition of these tablets is given by table V below.

TABLE V

| Composition | Distribution by weight (%) |
|---|---|
| Dextrose | 97.5 |
| Citric acid | 1.5 |
| Lemon flavour (powder) | 0.5 |
| Magnesium stearate | 0.5 |

The various constituents are mixed for 5 min in a TURBULA mixer sold by WILLY A BACHOPEN MACHINENFABRIK and the tablets are produced on a FROGERAIS reciprocating press fitted with concave 13 mm punches.

Table VI below summarises the results obtained with a reference crystalline dextrose of the prior art and the three dextrose hydrates C, F and H prepared according to examples 1, 2 and 3 above.

TABLE VI

| Dextrose | Crystalline dextrose | Dextrose C | Dextrose F | Dextrose H |
|---|---|---|---|---|
| Weight of tablets (mg) | 733 | 735 | 734 | 736 |
| Thickness of tablets (mm) | 6 | 6 | 6 | 6 |
| Density of tablets (g/ml) | 1.3 | 1.3 | 1.3 | 1.3 |
| Hardness ratio* | 1 | 1.5 | 1.6 | 4 |

*The term "hardness ratio" means the ratio of SCHLEUNIGER hardnesses of tablets prepared from dextrose according to the invention versus the hardness of tablets prepared with the reference crystalline dextrose.

All the mixtures carried out with dextrose hydrates according to the invention give much better results than those obtained with a conventional crystalline dextrose (from 1.5 to 4 times the hardness of the reference). It is confirmed that the best compressibility is still that of product H, which was prepared from a crystalline dextrose having a water content of 0.5%.

What is claimed is:

1. A dextrose hydrate in powder form, having:
   a dextrose content at least equal to 98%,
   an α crystalline form content at least equal to 95%,
   a water content greater than 1%,
   a compressibility at least equal to 70 N determined according to a test A, which reflects the resistance to crushing of a cylindrical tablet with convex sides (radius of curvature 13 mm), having a diameter of 13 mm, a thickness of 6 mm and a weight of 0.734 g, i.e. an apparent density of 1.3 g/ml, and
   a flow grade at least equal to 60.

2. The dextrose hydrate according to claim 1, having a water content in the range 2% to 10%.

3. The dextrose hydrate according to claim 2 having a water content in the range 5% to 9.5%.

4. The dextrose hydrate according to claim 1, having a compressibility of at least 90 N.

5. The dextrose hydrate according to claim 4, having a compressibility in the range 90 N to 200 N.

6. The dextrose hydrate in powder form according to claim 1, having a compressibility determined according to the test A in the range 150 N to 200 N and at least equal to 170 N according to a test B which measures, on an ERWEKA TBH 30 durometer, the resistance to crushing of a cylindrical tablet with convex sides (radius of curvature 13 mm), having a diameter of 13 mm, a thickness of 6 mm and a weight of 0.762 g, i.e. an apparent density of 1.35 g/ml.

7. The dextrose hydrate according to claim 6, having a compressibility determined according to the test B in the range 175 N to 300 N.

8. The dextrose hydrate in powder form according to claim 1, having:
   an apparent density of less than 0.7 g/ml, determined according to HOSOKAWA using the POWDER TESTER instrument which measures, under standardised and reproducible conditions, the flowability of a powder and calculates a flow grade, also known as the Carr index, and
   a mean diameter in the range 50 μm to 1000 μm.

9. The dextrose hydrate according to claim 8 having an apparent density in the range 0.45 g/ml to 0.65 g/ml.

10. The dextrose hydrate according to claim 9, having an apparent density in the range 0.5 g/ml to 0.6 g/ml.

11. The dextrose hydrate according to claim 8, having a mean diameter in the range 100 μm to 500 μm.

12. The dextrose hydrate according to claim 1, having a flow grade in the range 60 to 90.

13. A process for the preparation of a dextrose hydrate in powder form according to claim 1 comprising a step involving the rehumidification/granulation, using water or glucose syrup of a crystalline dextrose of substantially a form obtained directly by crystallisation or by partial or complete drying of crystalline dextrose monohydrate, and a step involving the ageing/drying of the rehumidified/granulated dextrose thus obtained.

14. The process according to claim 13 wherein the crystalline dextrose is an α crystalline dextrose having a water content greater than 1%.

15. The process for the preparation of a dextrose hydrate in powder form according to claim 14, wherein the α crystalline dextrose has a water content in the range of 2% to 10%.

16. The process according to claim 13 wherein the crystalline dextrose is an α crystalline dextrose having a water content at most equal to 1%.

17. The process for preparation according to claim 13, wherein die granulation step is carried out in a continuous mixer-granulator.

18. The dextrose in powder form, according to claim 6, wherein the compressibility, determined according to the test A is in the range of 180 N to 200 N, and according to the test B is greater than 220 N.

19. The dextrose in powder form according to claim 18, wherein the compressibility determined according the test B is greater than 230 N.

* * * * *